Dec. 27, 1927.
B. F. STENZ
1,654,387
MEANS FOR PREDETERMINING DENTAL REPLACEMENT
Filed Dec. 7, 1926  2 Sheets-Sheet 1
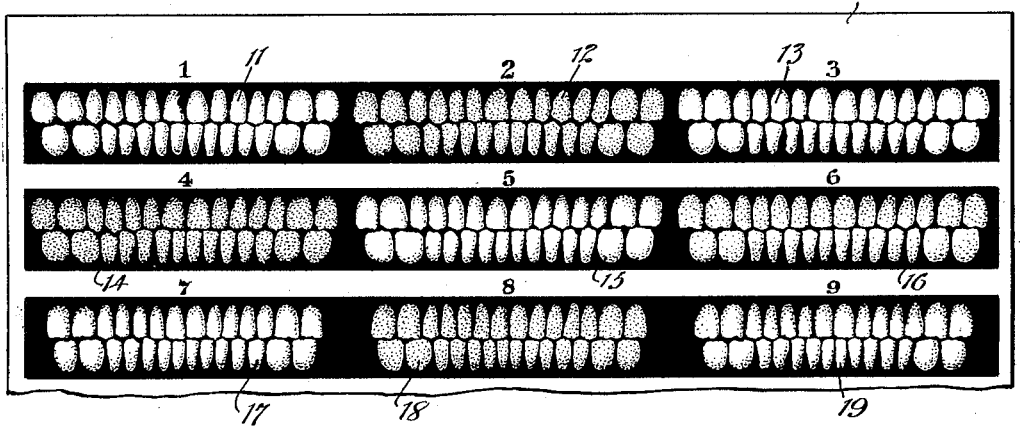
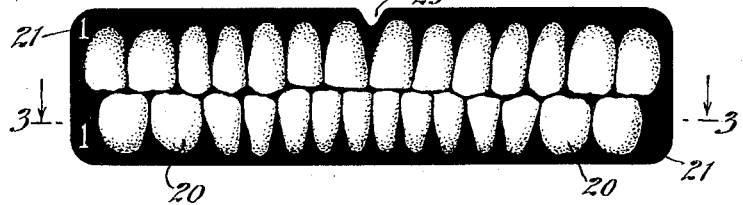
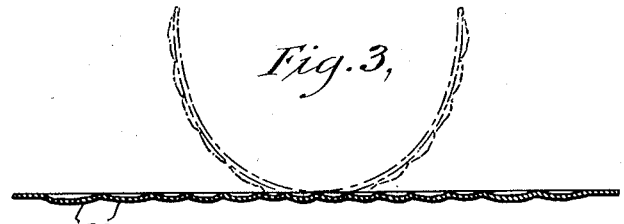
WITNESSES
INVENTOR
Bernard F. Stenz
BY
ATTORNEYS Dec. 27, 1927.
B. F. STENZ
1,654,387
MEANS FOR PREDETERMINING DENTAL REPLACEMENT
Filed Dec. 7, 1926
2 Sheets-Sheet 2

INVENTOR
Bernard F. Stenz
BY
ATTORNEYS

Patented Dec. 27, 1927.

1,654,387

UNITED STATES PATENT OFFICE.

BERNARD F. STENZ, OF NEW YORK, N. Y., ASSIGNOR TO SIMPLEX SAMPLING ASSOCIATION, INC., OF NEW YORK, N. Y., A CORPORATION OF NEW YORK.

MEANS FOR PREDETERMINING DENTAL REPLACEMENT.

Application filed December 7, 1926. Serial No. 153,200.

This invention relates to devices for aiding in predetermining dental replacement, and its primary object is to enable both the dentist and the patient to choose the best suitable artificial dental construction as to shape, size and color of teeth, for the patient whose natural teeth are to be replaced by artificial ones.

A further object of the invention is to provide means whereby the dentist or dental surgeon may readily and correctly display to the patient facsimiles or duplicates of the artificial tooth or teeth with which the patient is to be provided.

A further object of the invention is to provide, first, a chart showing in simulation of natural color and form, various types and sizes of teeth, and in conjunction therewith and correspondence thereto, separate and individual facsimiles or copies which may be placed in the mouth of the patient to give the latter an opportunity to judge the appearance and location of the artificial teeth to be subsequently provided in conformance with the said facsimiles or duplicates.

It is also an object of the invention to provide an embossed and naturally colored facsimile or copy of human teeth which may be inserted under the lips and across the gums of the subject, whereby is made possible the simulation of the appearance of natural teeth for various purposes in dental surgery, replacement or the like, and for other purposes; such other purposes, for example, are used on the stage and in the taking of moving pictures.

While the dental facsimiles contemplated in the invention are preferably embossed, they are not necessarily so produced; they may be lithographed or otherwise reproduced or formed, so as to simulate living teeth as to shape, size and color. An essential feature of the invention is that these facsimiles or copies when placed in the mouth actually do give to the observer the appearance of normal, natural teeth.

Referring more particularly to the drawings herein,

Figure 1 shows, for example, a chart of a series of nine sets of teeth produced by embossing, lithographing or otherwise, the sets all differing from each other in appearance, being numbered in sequence from 1 to 9.

Figure 2 shows in plan a facsimile of a single set of teeth produced by embossing, lithographing or otherwise, and corresponding in appearance to the set of teeth number 1 shown on the chart Figure 1.

Figure 3 is a longitudinal section on the line 3—3 of Figure 2, the same being shown in a different position in dotted outline.

Figure 4 is a view similar to Figure 2 of a facsimile of an upper set of teeth.

Figure 5 is a view of a facsimile similar to Figure 4 showing a lower set of teeth.

Figure 6 shows in plan a facsimile of a set of five upper teeth.

Figure 7:
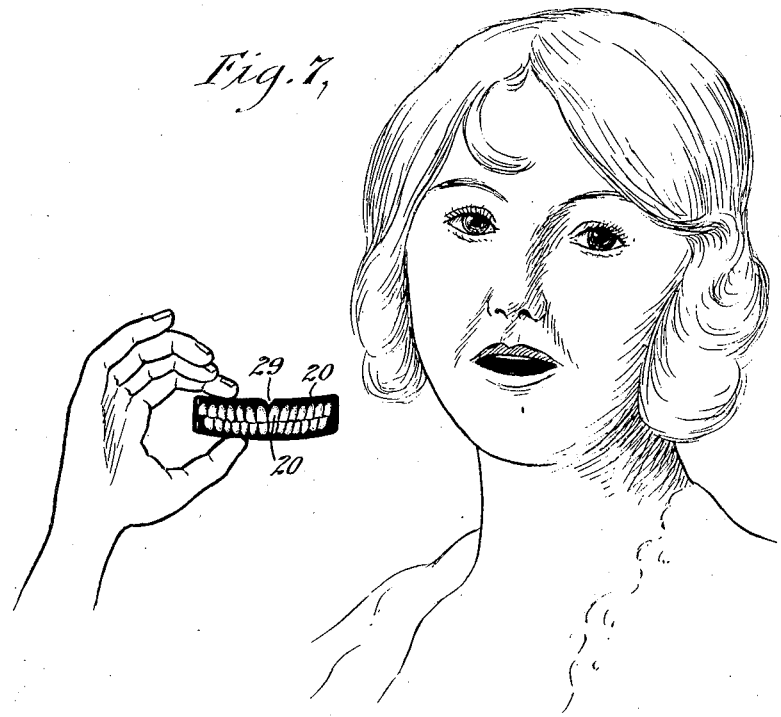
Figure 7 is a perspective view showing an individual about to insert one of the facsimiles in the mouth.

It is a matter of common knowledge that in providing artificial teeth to those who need them, little thought, hitherto, has been given to the use of any mechanical aid in the suitable choice of such artificial teeth, as to shape, size and color, largely because of the necessary difficulty in predetermining these factors. The shape, size and color of the artificial teeth should necessarily conform to the physiognomy of the user, in order that the eventual appearance may be of the best. Accordingly, as has been stated, it is one of the purposes of this invention to enable not only the dentist or dental surgeon, but primarily the prospective user to predetermine the appearance which will result from the installation of the artificial dentistry. It is not sufficient to examine charts or the like showing pictorial reproductions, even in color, of teeth, to make a proper judgment of the prospective appearance of the artificial teeth to be constructed. By means of the present invention, this can be accomplished expeditiously and with extreme simplicity.

The facsimiles of the artificial teeth to be used in connection with this invention may be fashioned from any suitable material adapted for the purpose, for example, from paper, celluloid, mixtures of paper and fabric, and the like. The sets of teeth produced upon the display chart may be of any suitable number, but preferably should comprise enough to give a fairly wide scope of appearance as to size, shape and color. They may or may not be embossed upon this display chart, but in my preferred form of the invention they are both embossed and naturally colored. The individual fascimiles should be sufficient in number to give the dentist an ample supply, for it is of course understood that after a patient has used one for observation purposes, this facsimile, for sanitary reasons, may be thrown away or destroyed, and it is possible that an individual patient may have to use quite a number of the facsimiles until a satisfactory set has been determined upon.

Referring now more particularly to the drawings, while I have shown in Figure 1 a portion only of a display chart, it will be understood that the same will consist of a suitable back or body 10 upon which the pictorial representations of the sets of teeth are embossed, lithographed or otherwise produced, preferably in natural size. For convenience, these sets may be arranged across the surface of the body 10 in sets of three, such, for example, as the sets 11 to 19, inclusive. To assist in easier scrutiny of these sets of teeth, I prefer to have them separated by demarcations of white or other colored background, though it will be understood that these details do not form an essential part of the invention. Primarily the chart is for the purpose of displaying to the dentist and the patient a substantial number of sets of teeth to give both a proper idea as to shape, size and color to be determined upon for the artificial teeth with which the patient is to be provided. Furthermore, the facsimiles will enable the dentist to order the desired artificial teeth or set of such teeth from the manufacturer by mail. For such mail order business the manufacturer preferably should have a corresponding chart or, if not, he can choose from the artificial teeth manufactured by him those corresponding in shape, size, color and the like to those shown on the facsimile forwarded to him by the dentist.

Figure 2 shows a facsimile of a complete set of teeth, upper and lower. This facsimile consists of a back 20 of paper or other suitable material preferably of moisture-proof character or having a moisture-proofed surfacing. These facsimiles may also be medicated to render them sterile, sanitary and free from germs. They may also be properly scented to minimize any unpleasant odor. The medication, scenting or deodorant may be applied thereto in any suitable manner and may be even incorporated in the printing or lithographic inks or varnishes used in their production. Thus, when the facsimile is introduced into the mouth of the patient, it will not only be sanitary but will be pleasant to the sense of smell. The corners 21 of the facsimile, too, are preferably rounded to facilitate insertion in the mouth and to minimize any possible injury of or inconvenience to the patient. The teeth 22 of normal size and shape are produced upon this facsimile preferably by embossing and lithographing. When the facsimile 20 is inserted in the patient's mouth, it is rounded as shown in dotted outline in Figure 3, to fit flat against the patient's teeth, or, in the absence of teeth, between the gums and the lips. This is clearly indicated in Figure 8. The coloration of the background of the facsimile may be of any suitable nature, though it preferably should conform to the normal color of the human gums. In the form of facsimile shown in Figures 2 and 3, as will be clearly seen in Figure 3, the teeth 20 are embossed, to enhance the natural appearance, the embossing simulating in depth the size of the particular teeth in question.

In Figure 4 is shown a facsimile of a single set of upper teeth having a body or back 23 with the teeth 24 suitably colored, embossed thereon. It will be noted that one edge of this facsimile corresponds to the free or serrated edge of the teeth.

Figure 5 shows a similar facsimile for a set of lower teeth, having a body or back 25 and teeth 26 embossed thereon.

In Figure 6 is shown a facsimile of a set of five teeth comprising a body or back 27 with the teeth 28 embossed thereon, or suitably colored, to render the appearance as natural as possible.

In the facsimile of Figure 2 there is a central notch 29 at the upper edge to facilitate the proper location of the facsimile in the mouth. Likewise, the devices of Figures 4 and 6 are provided with locating edge notches 30 and 31 for the obvious purpose already described. It will of course be understood that facsimiles of any numbers or particularly desired groups of teeth may be used for specific cases.

Figure 8:
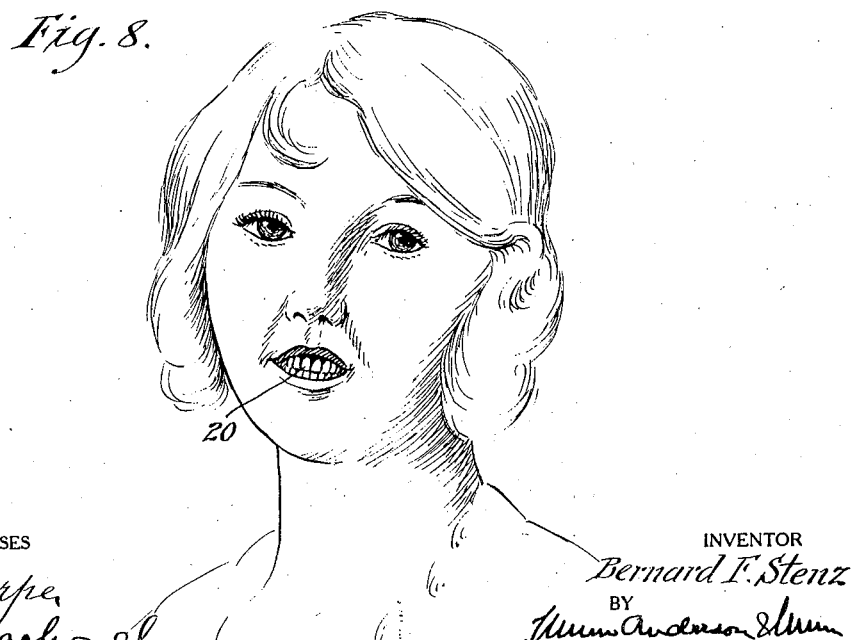
Figure 8 is a perspective view showing the individual with the facsimile in position and simulating, for the purpose of observation, a natural set of teeth.

The mode of use and application of the facsimiles of my invention are clearly shown in Figures 7 and 8. The facsimile, which may be slightly curved for introduction into the mouth, is placed between the gums and lips, and with the latter opened the effect is as indicated in Figure 8. There is no discomfort incident to the use of these devices, and a number may be successively used until the desired effect is arrived at. For the purposes of the speaking stage, orifices may be left in the facsimiles or separate upper and lower sets used. For use in the taking of moving pictures, this is not necessarily the case.

Having described my invention, I claim:

1. A device of the class described, comprising a thin, flexible member adapted to be inserted in the mouth between the lips and gums and having embossed thereon tooth outlines for the purpose set forth.

2. A device of the class described, consisting of a thin, flexible member adapted to be inserted in the mouth, between the lips and gums and provided with embossed and colored tooth representations.

3. A device of the class described, comprising a thin bendable strip having formed thereon embossed facsimiles of a plurality of human teeth for the purpose set forth.

4. A device of the class described, comprising a thin bendable strip having formed thereon embossed and colored facsimiles of a plurality of human teeth for the purpose set forth, and simulating natural teeth.

5. A device of the class described, comprising a thin flexible strip having embossed thereon a set of human teeth, said strip being shaped to fit in the mouth of the user between the lips and gums for the purpose set forth.

6. A device of the class described, comprising a thin flexible strip having embossed thereon a set of human teeth, said strip being shaped to fit in the mouth of the user between the lips and gums for the purpose set forth, said teeth embossed upon said strip being of normal human proportion and shape and being suitably tinted or colored.

BERNARD F. STENZ.